United States Patent [19]
Avondoglio

[11] Patent Number: 5,223,005
[45] Date of Patent: Jun. 29, 1993

[54] DUST AND FUME COLLECTOR

[75] Inventor: Leo Avondoglio, Ivoryton, Conn.

[73] Assignee: Aercology, Inc., Old Saybrook, Conn.

[21] Appl. No.: 929,228

[22] Filed: Aug. 14, 1992

[51] Int. Cl.$^5$ .............................................. B01D 46/04
[52] U.S. Cl. ........................................ 55/96; 55/291; 55/300; 55/302; 155/429; 155/472
[58] Field of Search ................... 55/96, 129, 300, 302, 55/304, 429, 467, 472

[56] References Cited

U.S. PATENT DOCUMENTS

| | | | |
|---|---|---|---|
| 1,259,008 | 3/1918 | Fraser | 55/291 |
| 1,295,216 | 2/1919 | Schmitt | 55/300 |
| 1,303,008 | 5/1919 | Anderson | 55/300 |
| 3,570,217 | 3/1971 | Steuernagel | 55/300 |
| 4,097,255 | 6/1978 | Samolis | 55/302 |
| 4,099,940 | 7/1978 | Mortensen et al. | 55/300 |
| 4,199,334 | 4/1980 | Berkhoel | 55/304 |
| 4,363,640 | 9/1981 | Avondoglio | 55/112 |
| 4,610,704 | 9/1986 | Richard | 55/302 |
| 4,704,144 | 11/1987 | LeBlanc et al. | 55/300 |
| 4,789,387 | 12/1988 | Nemesi et al. | 55/302 |
| 4,842,624 | 6/1989 | Barton | 55/291 |
| 5,013,333 | 5/1991 | Beaucoy et al. | 55/300 X |

OTHER PUBLICATIONS

Henlex, Inc., "Mobile Center VcAC-3" (1991), 4 pages catalog sheet.
Aercology Inc. "Cartridge Filters . . . " (1984) 2 pages catalog sheet CF Sep. 1984.
Dover Corp. "New Bernard Clean-Air Weld System" (1977) 4 pages catalog sheet #2808.
Mig Vac Inc. "All New Portable Vacuum Unit" (?pre 1991) 2 pages catalog sheet.

*Primary Examiner*—Charles Hart
*Attorney, Agent, or Firm*—C. G. Nessler

[57] ABSTRACT

A fume and dust collector system is comprised of a semi-rigid tubular filter compressively held against a sub-base by a beam. To dislodge accumulated particulate, a combination of gravity hammer rapping of the beam compressively loads the filter wall and pulses of air discharged into the filter interior tension the wall. The filter is removed through the top of the enclosure and particulate is removed through a drawer at the bottom.

10 Claims, 2 Drawing Sheets

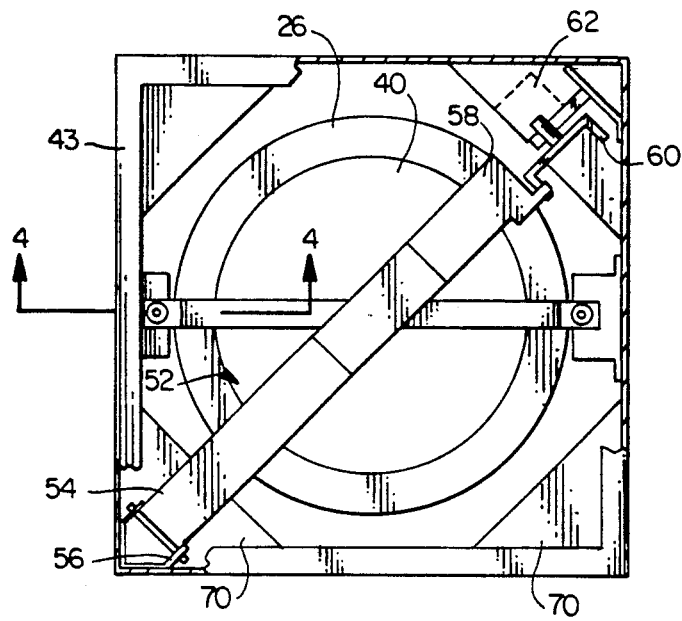
FIG.3
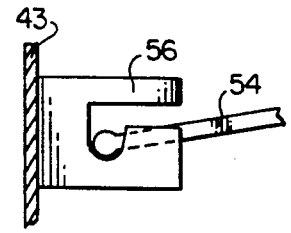
FIG.6
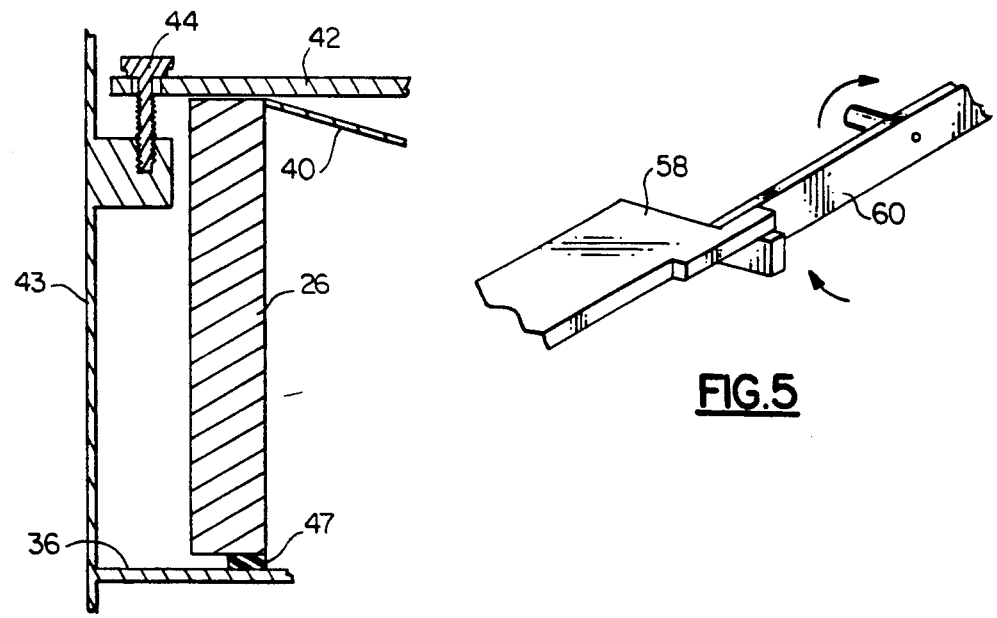
FIG.4
FIG.5

DUST AND FUME COLLECTOR

TECHNICAL FIELD

The invention relates to collection of dusts and fumes, particularly to portable apparatus for collecting fumes from welding processes.

BACKGROUND

Current occupational health standards and prudence require that the fumes generated during welding be collected and disposed of, rather than allowed to fill the air of a welding shop or to be discharged to the outside air. Other industrial processes generate airborne particulate and create the same requirement.

Industrial filtering systems made and sold heretofore to fulfil the need range from costly large centralized systems to small units that are little more than shop vacuum cleaners. The present invention is concerned with portable units that are intermediate in cost between the foregoing extremes, but which work satisfactorily in industrial settings, insofar as requiring minimal maintenance, being durable, and having flexibility of use.

Fume collectors seeking to satisfy the foregoing commercial needs are known. Generally, they operate by capturing the fume bearing air in a vacuum hose attached to the welding device, drawing the air through a permeable filter media, such as a fabric bag, to extract the particulate, and discharging the cleaned air into the room or outside. Over time, the media become clogged and air flow diminishes. Thus, there is a need for periodic cleaning, since discarding clogged media can be overly expensive. In general, the manner of cleaning filter media depend on their configurations and the type of particulate. Among the more familiar methods applied to bag filters is a simple vigorous shaking. Another method is to impinge a pressure pulse on the filter walls. In more elaborate systems, the cleaning is automatic and periodic. Generally, the aims for cleaning are that the means have low cost, make low demand on the operator's time and attention, minimize the interruption of the essential filtering function, and maximize the life of the media. No one optimum is discernible from the literature or commerce.

A fume collecting system ought to be simple to use and maintain. The operator ought to be able to inspect the system easily, to clean and change the filter readily and conveniently, and to be assured that the system will reliably perform its intended air-cleaning function. Thus, the design of the system ought minimize the extent to which the operator gets dirty while doing maintenance.

Prior art devices have deficiencies in various of the foregoing aspects and thus there is a need for a device having an improved combination of features.

SUMMARY OF THE INVENTION

An object of the invention is to filter fume and dust laden gases in an efficient and economic manner. A further object of the invention is to provide an air filtering system which is easy to maintain and provides for continuous operation in a convenient fashion.

In accordance with the invention, a filtering system has a semi-rigid tubular filter vertically supported on a sub-base within an enclosure; particulate laden air flows through the filter wall toward vacuum blowers, to remove the particulate; and, the filter is periodically cleaned by both an axial compressing induced by a hammer hitting a beam across the filter top, and by a circumferential tensioning induced by sending air pressure waves into the hollow interior.

In the best mode, a resilient compressed assembly is comprised of the sub-base on which the filter mounts, the filter, an elastomeric gasket under the filter, and a downwardly movable beam pressing on the filter top. Upon the dropping of the hammer of sufficient mass on the beam, the assembly is further compressed and shaken, to cause the particles to fall off. The particles which are dislodged fall through spaces around the sub-base on which the filter is mounted and are collected in a slidable drawer.

The invention achieves the needs in that the filter, beam, and hammer are conveniently configured for easy removal of the filter. The combination of filter cleaning devices sustains the proper operation of the invention. The objects of the invention are achieved at low cost.

The foregoing and other objects, features and advantages of the invention will become more apparent from the following description of the best mode of the invention and accompanying drawings.

BRIEF DESCRIPTION OF THE DRAWING

FIG. 3 is a top view of the main enclosure of the cart, showing the filter and beam clamp and hammering mechanism.

FIG. 4 is a cross section view of part of the assembly shown in FIG. 3.

FIG. 5 is shows how the hammer end is picked up by a motor driven arm and then dropped to deliver blows to the beam and filter.

FIG. 6 is a detail view of how the hammer pivots from the sidewall corner of the enclosure.

DESCRIPTION OF THE PREFERRED EMBODIMENT

Figure 1:
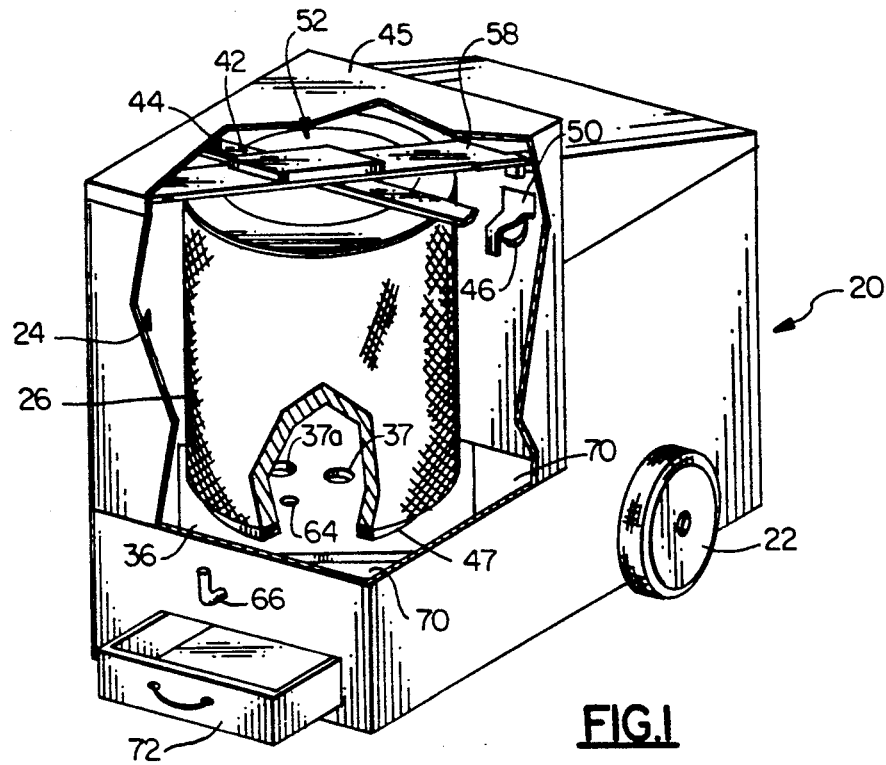
FIG. 1 shows in cut-away perspective a mobile cart containing the components of the invention including a large cylindrical filter within an enclosure.
Figure 2:
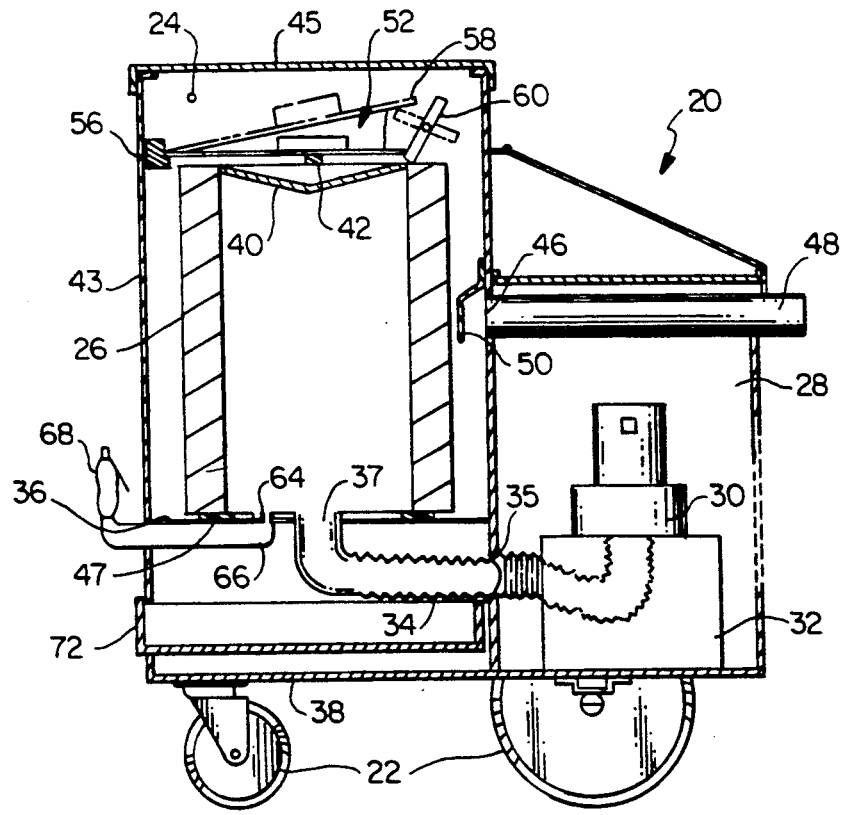
FIG. 2 is a side cross section of the unit in FIG. 1, illustrating the two chambers of the cart and other features of the invention.

FIG. 1 shows in cut-away perspective and FIG. 2 shows in elevation view a fume collection unit 20 embodying features of the invention. The 31 inch high by 30 inch long by 18 inch wide unit is adapted to be rolled about on wheels 22 using unshown handles. The device has two sheet metal chambers: a main enclosure 24 in which is contained a filter cartridge 26, and an auxiliary chamber 28 in which are contained two blowers 30, only one of which is shown, mounted on a stand 32. Each blower is connected similarly in parallel with the other. The blower shown draws cleaned air from an outlet port 35 of the enclosure, discharging the air into the chamber 28, from whence it vents to atmosphere through louvers in the sheet metal walls. There is another unshown like outlet port for the second blower. Each of the blowers has a capacity of about 110 cu ft/min at zero inlet static pressure and a vacuum of about 107 inch water column at cutoff.

The filter cartridge is a commercial tubular product, having zig-zagged non-woven fabric of chemically treated cellulose and synthetic fiber. There are metal pieces at each end which capture the fabric and they are connected by a wire mesh in the interior of the tube. The filter rests on a sub-base 36 mounted above and parallel to the enclosure base 38. Across the filter top is a dished sheet metal closure 40. The filter is about 14 inch dia and 18 inch high, has about 2 inch thick wall and 185 sq ft surface area, and weighs about 10 lb. The filter is characterized as semi-rigid because in one respect it is distinguishable from filter bags and fabrics in being like a rigid body —in sustaining its shape and in showing elastic behavior, as when the moderate particulate dislodging forces described below are imposed; but, in another respect, it is not rigid in that it is made of paper, metal mesh and light sheet —and substantial loads will permanently deform it, particularly at the wall.

The filter is pressed vertically down toward the sub-base by clamping beam 42 which spans a diameter of the filter, running between threaded knobs 44 attached to standoffs on the enclosure side walls 43. See FIG. 4 for more detail. The beam is a piece steel channel weighing about one 1b. Upon removal of the holding knobs and beam, the filter can be lifted out through the top opening after removal of the lid 45 which is held in place by unshown holding clamps. When ready for use, the force of the screwed down knobs puts the beam in bending tension, and beam puts the filter and elastomeric gasket 47 between the filter and the sub-base in a compressed state.

The line 34 from the outlet port 35 and one blower is connected to a port 37 near the center of the sub-base 36. The other blower is connected likewise to a port 37a. Thus, the blowers will cause fume laden air to flow from inlet port 46 sideways through the filter wall —where particulate is removed and accumulated—and then downwardly to the ports 37, 37a. For convenience of the operator, a line 48 extends laterally from inlet port 46 to the end of the cart, to enable easy connection of a flexible line running from the welding torch and point source of fumes. A baffle 50 is positioned in line with, but spaced apart from, the inlet port 46, to deflect any large particles and sparks downwardly, so they do not damage or ignite the filter.

The Figures also illustrate the two ways in which the fumes and dust are dislodged from the filter wall. First, a hammer 52 may be activated to rap sharply on the beam 42, thereby compressing and shaking the filter wall, dislodging particles. FIG. 2 shows how the hammer pivots from a corner of the enclosure, running at a 45 degree angle to the beam, to facilitate the interaction now described. The hammer, weighing about 5 lb, is lifted in the air and gravity dropped a mean distance of about 2 inch onto the beam, rapping the beam and filter wall. The mass and drop of the hammer are related to the beam and filter mass and elasticity of the beam-filter-gasket assembly: They must be sufficient to compress the filter-gasket system and obtain quick inertial motion of the filter surface.

FIGS. 3, 5 and 6 give more detail on how the hammer works. Hammer end 54 incorporates a pin which rests in a slotted saddle 56 mounted off the enclosure side wall 43, enabling both pivoting and easy removal for changing the filter. See FIG. 6. The hammer has a concentration of mass, preferably slightly off center toward the pivot. The hammer outer free end 58 has a finger which is engaged by a C shaped arm 60 rotated at about 18 rpm by a motor 62, shown in phantom. FIG. 5 shows in closer detail how the arm engages the hammer free end finger, lifting it in the air to the point where continued rotation of the arm disengages the two parts, whereupon the hammer drops by gravity onto the beam with substantial force, bouncing somewhat. Since there is space under the beam where it is held by the threaded knobs 44, the beam is able to float vertically downwardly as well as deflect when hit. The beam, filter, gasket, and sub-base assembly has resilience, and after compression and vertical displacement of the filter, the assembly's original configuration is restored as the beam is pushed back against the knobs.

The second manner of removing particles is by sending a pulse of air into the filter interior, causing adhered particles which are not removed by the hammering to fall off. FIGS. 1 and 2 show an orfice 64 positioned on the sub-base to access the interior of the filter. The orfice is connected by line 66 to a spring loaded valve 68 at the exterior of the enclosure. An air supply of 80-120 psig is connected to the valve 68 during use, and manual triggering of valve 68 on and off, causes air pressure pulses to be sent into the filter interior. The orfice 64 is configured for sonic flow, e.g., it is 3/16 inch dia, for a normal shop air supply. The resultant pulse of air creates a pressure wave which emanates through the interior of the filter, interacting with the walls and particles thereon. The flow of air which comprises the pressure pulse wave is opposite in direction to the flow of the air being cleaned. Thus, it tends to push the filter wall outwardly, putting it in circumferential tension. If fluffs and dislodges the particles. Consequently, the action is different from, and works in combination with, the action induced by the hammer.

The degree to which each of the two ways of dislodging particles is used depends on the nature of the fumes or dust. For most normal practice, the hammer-rapper is used every few hours for about 0.5 min (about 18 raps) to remove the coarser particulate, and then the air pulsing is used less frequently, e.g., every 8 hr, following a rapping. Pulsation rate, chosen by the operator, will typically comprise about 30 pulses/min; thus both the hammering and pulsing are characterized as being low frequency. Most often the blowers will be turned off to facilitate the dislodging.

The particles dislodged by either rapping or air pulsing fall downwardly, eventually falling through spaces 70 between diamond shaped sub-base 36 and the sides of the enclosure, and into a drawer 72. The drawer is slidable out from the end of the enclosure for emptying. Of course, while preferred for operator convenience, the drawer can be omitted in the essential practice of the invention, and the sub-base can rest on and be integral with the enclosure base. Similarly, it will be seen that other shape sub-bases can be used.

An optional practice of the invention comprises placing a vertical distribution pipe with spaced apart holes over sub-base opening where orfice 64 is, to carry the pressure pulsing air along over the length of the filter, as is known in the art. Another known variation is to jet the pressure pulse through a venturi, to entrain additional mass of air and supposedly increase the efficacy. Neither option has been found necessary in the size of filter which is described here.

The invention has been described in terms of a cylindrical filter cartridge, but it will be applicable to other hollow filter shapes as well. While using the gasket 47 is ordinary with the tubular filter cartridges, the filter has sufficient resilience to be used without it, e.g., with a less convenient thin paper gasket. However, the gasket, which is about 0.5 inch thick increases the resilience of the filter, beam, sub-base assembly, and the capability for vertical displacement. While the beam has been described as a straight channel, other configurations which achieve the objectives are within contemplation. For example, the beam could be a triangle shape with three bolting points. The hammer has been described as a gravity dropped device because of a combination of cost and desire to allow the filter, sub-base, filter, and hammer assembly to achieve its own natural vibratory mode to a fixed force. However, it is within contemplation that other hammer configurations could be used, including those with controlled displacement instead of force. For example, a linear motor or cam might be used.

In use, the operator decides by observation when the filter needs cleaning, and determines the time during which the hammering and pulsing are applied. A simple momentary contact electric control of the hammer motor and a manual air valve are thus provided for low cost. However, more sophisticated controls may also be applied to the invention to automatically carry out what is described.

Although only the preferred embodiment has been described with some alternatives, it will be understood that further changes in form and detail may be made without departing from the spirit and scope of the claimed invention.

I claim:

1. Apparatus for removing particulate from air comprising:
    an enclosure for containing a filter, having a base, a removable top, a first air inlet for particulate laden air, a second air inlet for high pressure air, and an air outlet;
    a sub-base, for receiving a filter, fixed within the enclosure and having a first port connected to the air outlet and a second port connected to the second air inlet, for receiving the filter;
    a second rigid tubular filter with a closed upper end, shaped to fit through the removable top of the enclosure, mounted vertically on the sub-base to circumscribe the first and second ports thereof, for capturing particles from air passing from the first air inlet through the filter walls, to the first port and thence to the air outlet;
    vertically movable beam mounted across the closed top of the filter, tensioned downwardly to thrust the filter against the sub-base and to transmit vertical hammer forces imposed on the beam to the filter;
    a hammer with actuating means, positioned above the movable beam to vertically rap and move the beam, to thereby compressively shake the filter wall, to periodically loosen particulate captured on the filter sides; and
    means for pulsing high pressure air flowing from the second air inlet to the sub-base second port, and thence to the filter wall in direction opposite to the flow of air laden with particulate, to tension by pressure wave the filter wall and further periodically loosen particulate adhered to the filter sides.

2. The apparatus of claim 1 comprising a vacuum blower connected to the air outlet, for causing a flow of particulate laden air from the first air inlet to the filter where particulate is removed from the air.

3. The apparatus of claim 1 characterized by a resilient assembly comprised of the sub-base, beam, filter, and an elastomeric gasket positioned between the tubular filter and the sub-base, to elastically react to blows from the hammer.

4. The apparatus of claim 1 characterized by an air distributor pipe mounted vertically on the sub-base above the second port, having apertures along its length, to distribute air pulses along the interior length of the filter.

5. The apparatus of claim 1 characterized by a hammer with actuating means comprised of an electric motor and cam, and means for momentarily activating the motor.

6. The apparatus of claim 5 characterized by a hammer which drops by gravity onto the beam.

7. The apparatus of claim 1 characterized by a flat plate sub-base having spaces outside the circumference of the filter, to enable particles falling from the filter to fall therebelow; and, a drawer mounted beneath the sub-base and slidable through a wall of the enclosure, for receiving particulates which are dislodged from the filter.

8. The apparatus of claim 1 characterized by an enclosure having a second air outlet like the first air outlet; and, a sub-base having a third port like the second port, connected to the second air outlet.

9. The apparatus of claim 1 characterized by two vacuum blowers, a first one connected to the first air outlet and a second one connected to the second air outlet.

10. The method of removing fume and dust particulate from air comprising:
    compressively fastening a semi-rigid tubular filter so it has a vertical axis and vertical filter wall;
    drawing particulate laden air sideways through the filter wall, to cause particulate to accumulate thereon;
    dislodging accumulated particulate from the vertical wall of the filter by periodically applying low frequency vertical axis compressive loads to the filter wall combined with periodically applying low frequency sharp circumferential tensile loads to the walls of the filter; and,
    collecting the dislodged particulate at a location below the filter walls.

* * * * *

UNITED STATES PATENT AND TRADEMARK OFFICE
CERTIFICATE OF CORRECTION

PATENT NO.  : 5,223,005
DATED       : June 29, 1993
INVENTOR(S) : Leo Avondoglio It is certified that error appears in the above-indentified patent and that said Letters Patent is hereby corrected as shown below:

Column 5, line 41, change "second" to --semi- --

Column 5, line 48, insert --a-- before "vertically"

Signed and Sealed this

Fifteenth Day of February, 1994

Attest:

BRUCE LEHMAN

Attesting Officer

Commissioner of Patents and Trademarks